April 14, 1936.  J. J. PAUGH  2,037,040
SPOT WELDING GUN
Filed July 5, 1934
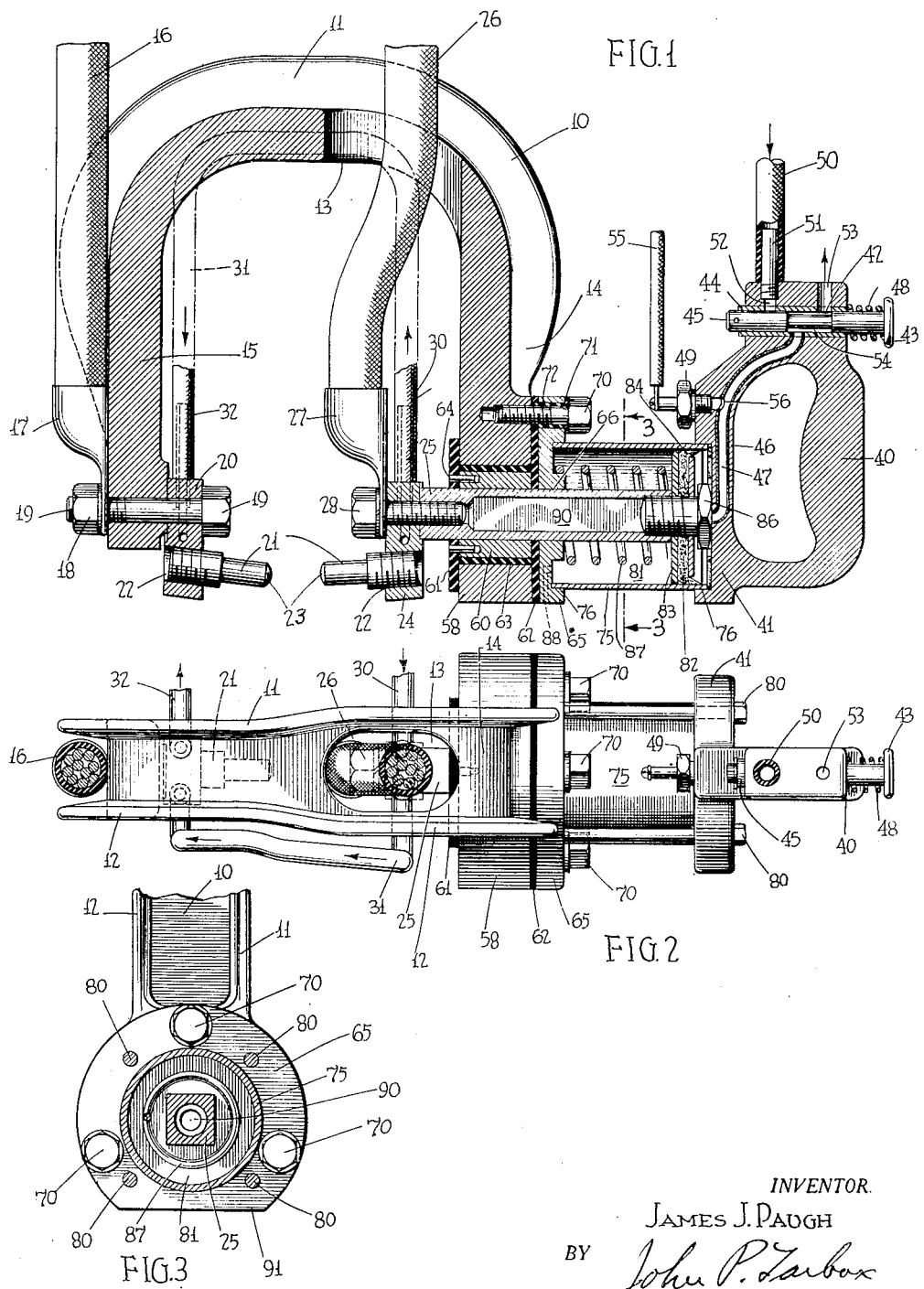
INVENTOR.
JAMES J. PAUGH
BY John P. Tarbox
ATTORNEY.

Patented Apr. 14, 1936

2,037,040

UNITED STATES PATENT OFFICE 2,037,040

SPOT WELDING GUN

James J. Paugh, Philadelphia, Pa., assignor to Edward G. Budd Manufacturing Company, Philadelphia, Pa., a corporation of Pennsylvania Application July 5, 1934, Serial No. 733,731

8 Claims. (Cl. 219—4)

This invention relates to welding apparatus and more particularly to portable, i. e. hand, welding tools for electric resistance welding and more especially to spot welding.

Among the more important objects of the invention may be pointed out flexibility of construction, reduction in weight, improvement in operation, increased life of the parts, rapidity of replacement and repair, interchangeability, adjustability, and others in combination or individually, although not specifically enumerated.

The foregoing objects and others not mentioned have been attained by the construction of a welding gun of simplified construction as shown.

Figure 1 is a transaxial vertical cross section of a welding gun made according to this invention.

Figure 2 is a plan view of the gun of Figure 1.

Figure 3 is a partial cross section on the line 3—3 of Figure 1.

Broadly speaking the welding gun of this invention comprises relatively movable electrodes or dies and structural means carrying those parts and retaining them in cooperative relation and providing controlled movement of the same.

In one form of construction a yoke is utilized carrying a fixed electrode member, the yoke having secured thereto a piston and operating handle, the piston engaging the movable electrode through a suitable piston rod. Air or some other operating medium is admitted to the one end of the cylinder forcing the piston to move from right to left, thus moving the electrodes together. At the completion of the stroke the pressure of the cylinder builds up and causes a pressure operated electrical contact to be actuated, thus effecting an energization of the electrodes to effective welding current strength.

Portable welding tools are known in the art but they are each and all subject to some disadvantage of one sort or another. Tools of this nature are frequently subjected to many welding operations per day and may in production operations during the course of a month, be operated in the neighborhood of about 800,000 times. This may entail considerable wear, loose connections and worn parts, misalignment of the dies, and numerous other difficulties, as well as large initial costs and/or up-keep. To overcome these disadvantages, the utilization of short time welding intervals may assist in reducing the period of heating of the guns and by the utilization of large cross section conductors of the flexible stranded type, larger in cross section than those normally required, without reducing the flexibility of the system, the heating effects are very materially reduced.

By way of more detailed description, the welding gun is comprised of a yoke 10 of substantially channel section in part having side walls 11 and 12 and cut away at other parts as at 13, giving a very small weight while attaining great structural rigidity and providing protection to the conducting cables. The utilization of materials of low specific gravity, enables a highly desirable tool to be obtained.

One side 14 of this yoke 10 is adapted to be secured to the holding parts of the device, whereas the opposite side 15 is arranged to receive one welding cable 16 forming an electrical connection from the secondary of the welding transformer and secured to the yoke by its respective terminal 17 and the nuts and bolts 18 and 19. The yoke is insulated from the remaining parts of the welding tool in such a manner that the conducting connection just described can in no wise short circuit the secondary of the welding transformer. To the yoke end 15 is secured a die 20 to which can be secured a removable electrode 21. This electrode may be threaded at 22 for connection with the die and its tip 23 may be of material having special strength and wearing properties. The opposite die 24 which moves relatively to the first die is arranged to be secured to the piston rod 25, which passes through the yoke, and has a similar electrode secured thereto. The opposite cable 26 from the secondary of the welding transformer is secured to the die 24 by a suitable terminal 27 and bolt 28. It passes through the opening 13 in the base of the channel section of the yoke 10, insuring flexibility and protection and general workable relationship of the parts. Cooling of the electrodes 23 and the dies 20 and 24 can be accomplished by cooling with water or some other medium by way of example as accomplished by a tube 30 providing an inlet to the die 24 which in turn is exhausted to the tubular member 31 carrying the cooling medium to the die 20 and exhausting from the said second die through a tubular member 32. The arrangement thus far described provides a maximum flexibility as to heating and cooling as well as replacement of parts and as to production costs when making these tools. The dies and electrodes are readily interchangeable, the flexible conductors are interchangeable and the tubing is interchangeable, requiring merely a standard part which may be utilized in both positions. The bolts 28 and 19 can also be standardized.

The handle for the gun is preferably of cast metal, and may for example be a magnesium alloy, having a main grip portion 40 and a portion 41 arranged for connection to the cylinder of the gun. Operation of the gun is obtained through a valve controlled mechanism 42 having a thumb grip 43. The cylinder wall 44 and the valve part 45 may be of machined corrosion resisting steel, thus giving long wear and insuring tightness of the parts while avoiding losses of air pressure. The valve housing member 44 may be cast into the handle as may likewise be a tube 46 providing the air duct or passage 47 from the valve to the cylinder 81. The valve controls the air supply coming from flexible tubing 50 which is in turn secured to a tubular member 51 threadedly engaged in the handle 40 and a port 52 controlled by the valve. This is the inlet port of the air supply. The exhaust port 53 also connects with the valve and is so arranged that the air passage 47 is exhausting to the atmosphere through the port 53 and the valve 54 at all times during which the valve is not in operative position, such position being accomplished by movement against the grip 43 in opposition to the spring 48. When the valve is pushed to the left the port 53 is closed and the inlet port 52 is opened through the valve ports 54 to the passage 47, allowing the admission of the air or other medium to the cylinder 81. When the piston 82 has been operated, air pressure in the passage 47 builds up and through the port 56 effects an operation of the electrical switch 49 which in turn through its leads 55 closes the welding circuit timer. The portion 41 of the handle 40 is substantially disc-like in nature for cooperation with the cylinder parts.

The handle and yoke are interconnected by suitable parts comprising the cylinder, piston and their correlated elements. The yoke has a portion 58 substantially disc-like having a central opening for the reception of some of the cylinder parts. In the central opening is positioned a metallic member 60 having a square bearing opening therein, said member being insulated from the yoke by insulating discs 61 and 62 and an insulating sleeve 63. The discs and bearing member are connected together by the pin 64 to retain them in their adjusted position. A further disc-like member 65 having a square central bearing portion 66 is arranged to be secured to the yoke by a plurality of bolts 70, each of which is insulated by insulating discs or washers 71 and sleeve 72. The arrangement thus far provides a rigid construction which is insulated in a manner to maintain the two terminal circuits of the secondary of the welding transformer separated.

The connection of the yoke and handle is completed by the cylinder walls 75. This is preferably standard dimension brass tubing, thus allowing the stroke of the welding gun to be readily changed by the length of the tubing. This also allows the forces to be readily adjusted by a different diameter tubing providing for different working conditions. The cylinder 75 is seated within undercut portions 76 in both the handle and the member 65. To retain the handle and cylinder in readily demountable condition, a plurality of bolts 80 are utilized, thus providing a rigid connection between the parts while at the same time allowing for ready demountability or taking apart of the gun for the replacement or substitution of any part.

The cylinder 81 has a piston 82 composed of two metal washers 83 and a suitable leather type packing 84. These metallic discs 83 are of such dimension as to be free of the cylinder walls and are not utilized for bearing purposes in any manner whatsoever, but merely serve as stiffening means for the piston material 84. This piston is secured by a bolt 86 to the piston rod 25 in a screw threaded connection. In this manner, should the backing wear out, all that is necessary is to release the bolts 80, remove the handle, unfasten the bolt 86 and replace the piston parts and restore the handle and fasten the bolts 80. This is a simple operation and is not time consuming in any manner whatsoever and without even removing the welding gun from the production line, the change can be made in a few minutes. The lack of contact of the metal discs 83 with the cylinder wall materially reduces wear of the parts and in this manner aids the economy of operation of the device. A spring 87 within the cylinder maintains the piston at the right hand end of its stroke so long as the pressure medium is not acting thereupon. The cylinders preferably have small ports 88 on the opposite side from the pressure portion of the cylinder so that any leakage of the pressure medium which might occur is released to the atmosphere and no build-up of pressure opposing the operation of the gun can occur.

The piston rod 25 is in cross section a hollow square member. It rides in square bearings in the parts 60 and 65, the said bearings being of considerable length. These bearings may be in the nature of 1½ or 2 inches, whereas in most welding guns this bearing would be at most about a quarter of an inch, depending upon the metallic disc members of the piston engaging the cylinder walls to provide the other element to maintain alignment of the parts. By the present arrangement, the electrodes 21 being set, there is no danger of their getting out of alignment. In this way the parts may be reduced, accuracy and rigidity of the dies and electrodes maintained and other economies instituted at one and the same time. The piston rod 25 can preferably be hollow as at 90, further reducing weight in the gun.

The cylinder walls and the handle have been separated in two parts, making the same much more accessible for adjustment and repair, and eliminating any awkward operations resulting in delay when repairs are necessary. Furthermore, the base of the various parts may be flat as at 91 to enable the gun to be set down without injury to its parts. The method of aligning and supporting the electrodes is so re-organized as to assure accurate alignment at all times and reducing wear to a minimum. Metal guides for the piston and the necessary wear on the cylinder walls have been avoided, additionally cutting down weight. Simplicity of repair and cleaning of the tool is greatly enhanced.

While by way of illustration and example I have described my invention in connection with a preferred embodiment thereof as to structure, and the preferred manner of practicing it, it will be obvious to those skilled in the art, after understanding the foregoing specification, that various changes and modifications may be made without departing from the spirit or scope of the invention and I aim in the appended claims to cover all such modifications and changes.

What I claim is:

1. A spot welding gun comprising, in combination, separable yoke and handle portions, relatively movable electrodes associated with the yoke and means separable in transverse planes from both yoke and handle interconnecting said yoke and handle and arranged to effect the relative movement of the electrodes.

2. A spot welding gun comprising, in combination, separable yoke and handle portions, relatively movable electrodes associated with the yoke and means comprising a fluid cylinder axially clamped between said yoke and handle but separate therefrom and arranged to effect the relative movement of the electrodes, and means arranged to maintain alignment of said electrodes which means comprises a piston rod fixed against movement about the axis and carrying a movable electrode.

3. A spot welding gun comprising, in combination, separable yoke and handle portions, relatively movable electrodes associated with the yoke and means comprising a fluid pressure cylinder and piston axially clamped between said yoke and handle and arranged to effect the relative movement of the electrodes, and means including a polygonal cross section piston rod having a polygonal bearing arranged to maintain alignment of said electrodes.

4. A spot welding gun comprising, in combination, a yoke, a handle for said gun, a cylinder connecting said handle and yoke, said handle having a grip portion, a substantially disc-like cylinder head portion, and means controlling the movement of the piston and the energization of the welding circuit, said yoke carrying a substantially disc-like portion, a cylinder head member engageable with the disc-like portion of said yoke and said cylinder and insulated from the yoke, a piston in said cylinder, relatively movable electrodes, means interconnecting said piston and electrodes and arranged whereby to effect the relative movement of the same, and means associated with said cylinder head member and said yoke but insulated from the yoke and arranged to provide a longitudinally extended bearing for the piston rod to maintain alignment of the electrodes.

5. A portable spot welding machine comprising a yoke of substantially channel shaped cross section, a handle for said machine, a cylinder secured between said yoke and handle, a piston movable in said cylinder, relatively movable electrodes on said machine, one of said electrodes fixed to the yoke, the other of said electrodes fixed to the piston, a valve in said handle arranged to control the movement of said electrodes and electrical control means on said handle arranged to be actuated after a predetermined condition of electrode movement, and flat portions on the yoke and handle extending transversely of the gun on the side opposite the bight of the yoke arranged to provide a base for retaining the gun with the handle in upright position.

6. A portable spot welding machine comprising a yoke of substantially channel shaped cross section, a handle for said machine, a cylinder secured between said yoke and handle, a piston movable in said cylinder, relatively movable electrodes on said machine, one of said electrodes fixed to the yoke, the other of said electrodes fixed to the piston, a valve in said handle arranged to control the movement of said electrodes and electrical control means on said handle arranged to be actuated after a predetermined condition of electrode movement, an opening in the closed side of the yoke and electrical conductors from the secondary of a welding transformer secured in electrical connection with the electrodes, one of said conductors passing through the opening in the yoke and the other of said conductors extending along the base of the channel portion of the yoke, whereby the conductors are retained in the plane of the yoke until they are free of the same at the bight side of the yoke.

7. In a portable welding gun a U-shaped yoke carrying relatively movable electrodes at its opposite extremities and carrying also means for operating them, which yoke is provided with a flat surface at right angles to the plane of the yoke and constituting its portion most laterally remote from the bight of the yoke wherethrough the gun may be rested upon the flat surface of a work bench with the plane of the yoke substantially at right angles thereto.

8. In a portable welding gun a U-shaped yoke, relatively movable welding electrodes carried from opposite extremities of the yoke, the yoke having hollow cross section, electrical connections to the electrodes, one of which lies in the hollow cross section of the yoke and the other of which passes transversely through the bight portion of the yoke from the inside thereof, whereby the connections are maintained at all times substantially in the plane of the yoke, and means for operating the electrodes.

JAMES J. PAUGH.